United States Patent
Kishimoto et al.

(10) Patent No.: US 8,465,171 B2
(45) Date of Patent: Jun. 18, 2013

(54) HEADLAMP AND VEHICLE INFRARED NIGHT VISION APPARATUS EMPLOYING THE HEADLAMP AS LIGHT SOURCE

(75) Inventors: Katsuhiko Kishimoto, Nara (JP); Junichi Kinomoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 288 days.

(21) Appl. No.: 12/402,309

(22) Filed: Mar. 11, 2009

(65) Prior Publication Data

US 2009/0231874 A1 Sep. 17, 2009

(30) Foreign Application Priority Data

Mar. 13, 2008 (JP) ................................. 2008-064530

(51) Int. Cl.
*F21V 9/00* (2006.01)

(52) U.S. Cl.
USPC ............................. 362/230; 362/293; 362/510

(58) Field of Classification Search
USPC .................................. 362/230–232, 293, 510
See application file for complete search history.

(56) References Cited

U.S. PATENT DOCUMENTS

| | | | | |
|---|---|---|---|---|
| 6,252,254 | B1 * | 6/2001 | Soules et al. | 257/89 |
| 6,634,776 | B2 * | 10/2003 | Yagi et al. | 362/510 |
| 6,982,522 | B2 * | 1/2006 | Omoto | 313/502 |
| 7,378,686 | B2 * | 5/2008 | Beeson et al. | 257/100 |
| 2004/0124758 | A1 * | 7/2004 | Danielson et al. | 313/486 |
| 2005/0083686 | A1 * | 4/2005 | Yatsuda et al. | 362/230 |
| 2005/0236960 | A1 * | 10/2005 | Kupper et al. | 313/489 |
| 2006/0038198 | A1 * | 2/2006 | Chua et al. | 257/100 |
| 2006/0164003 | A1 * | 7/2006 | Chan et al. | 313/498 |
| 2007/0064751 | A1 * | 3/2007 | Tokunaga | 372/22 |
| 2007/0161786 | A1 | 7/2007 | Mitsunaga et al. | |
| 2007/0285939 | A1 | 12/2007 | Tachibana | |
| 2008/0265208 | A1 | 10/2008 | Mitsunaga et al. | |

FOREIGN PATENT DOCUMENTS

| | | |
|---|---|---|
| JP | 2001-60403 A | 3/2001 |
| JP | 2004-241138 A | 8/2004 |
| JP | 2005-081902 A | 3/2005 |
| JP | 2005-136224 A | 5/2005 |
| JP | 2005-203326 A | 7/2005 |
| JP | 2006-143114 A | 6/2006 |
| JP | 2006-147195 A | 6/2006 |
| JP | 2006-328032 A | 12/2006 |
| JP | 2007-154066 A | 6/2007 |
| JP | 2007-294754 A | 11/2007 |
| JP | 2007-329068 A | 12/2007 |

\* cited by examiner

*Primary Examiner* — Julie Shallenberger
(74) *Attorney, Agent, or Firm* — Birch, Stewart, Kolasch & Birch, LLP

(57) ABSTRACT

A headlamp is provided, which has lower power consumption, a longer service life and a more compact size and yet is capable of easily projecting visible light and near infrared light in desired light distribution patterns. The headlamp includes a wavelength converting member and an excitation light source. The wavelength converting member includes a visible light fluorescent material which is excited by excitation light emitted from the excitation light source to emit visible light, and a near infrared fluorescent material which is excited by the excitation light emitted from the excitation light source to emit near infrared light. The visible light and the excitation light are mixed together to generate white light. The excitation light source is a semiconductor solid-state element.

17 Claims, 4 Drawing Sheets

HEADLAMP AND VEHICLE INFRARED NIGHT VISION APPARATUS EMPLOYING THE HEADLAMP AS LIGHT SOURCE

CROSS-REFERENCE TO RELATED APPLICATIONS

This application is related to Japanese patent application No. 2008-64530 filed on Mar. 13, 2008, whose priority is claimed under 35 USC §119, and the disclosure of which is incorporated by reference in its entirety.

BACKGROUND OF THE INVENTION

1. Field of the Invention

The present invention relates to a headlamp. More specifically, the invention relates to a headlamp which is advantageously used as a light source for an infrared night vision apparatus for a motor vehicle such as an automobile.

2. Description of the Related Art

In recent years, a safety technique that makes it easy to visually detect pedestrians and obstacles in the dark by means of an infrared night vision apparatus has been increasingly employed for enhancement of safety in driving an automobile at night.

Various types of automotive night vision apparatuses have been developed which, for example, include a so-called passive type and a so-called active type.

An automotive night vision apparatus of the passive type is configured such that far infrared radiation emitted from a pedestrian, an animal or the like is captured by an infrared camera for detecting the pedestrian, the animal or the like.

An automotive night vision apparatus of the active type is configured such that a pedestrian, an animal or the like present ahead is detected by projecting near infrared radiation forward, capturing reflection of the radiation by means of a camera, and displaying a captured image on a display device.

In the automotive night vision apparatus of the passive type, the infrared camera, which captures a very small amount of far infrared radiation emitted from the pedestrian, the animal or the like, is very expensive.

On the other hand, the automotive night vision apparatus of the active type, for example, utilizes the fact that light emitted from a bulb such as a halogen lamp contains near infrared radiation. That is, a high beam (also called "driving beam") as well as a low beam (also called "pass-by beam") are emitted from the headlamp, and only the near infrared radiation contained in the high beam is projected forward through a near infrared filter, and reflection of the near infrared radiation is captured by the camera.

There is also known an arrangement that includes a visible LED, a near infrared LED and a single reflection mirror for projecting visible light as well as near infrared light forward (see, for example, Japanese Unexamined Patent Publication No. 2004-241138).

However, where the bulb for the high beam projection is used as a near infrared light source, the high beam bulb is constantly turned on, disadvantageously leading to a significant increase in power consumption.

That is, the high beam bulb leads to the significant increase in the power consumption of the headlamp because the high beam bulb is turned on even during the projection of the low beam. At the same time, the high beam bulb suffers from a shorter service life and hence a shorter bulb change cycle because the high beam bulb is constantly turned on.

Where a light source for projection of the near infrared light is separately provided, an optical system including a lens and a reflection mirror is essentially required for projecting the near infrared light several tens of meters to 100 meters ahead. Provision of the dedicated optical system inevitably increases the size of the entire infrared night vision apparatus.

Where an optical system for either of the low beam or the high beams is doubled as the optical system for the near infrared light for prevention of the size increase of the apparatus, the low beam bulb or the high beam bulb is located at the focal point of the optical system to provide a proper light distribution pattern. Therefore, the optical system of the headlamp is disadvantageously complicated in order to project the near infrared light in a desired light distribution pattern.

The aforementioned arrangement including the visible LED, the near infrared LED and the single reflection mirror is capable of projecting the visible light and the near infrared light with lower power consumption. However, the visible LED and the near infrared LED should be positioned with respect to the single reflection mirror with a higher positioning accuracy in order to project the visible light and the near infrared light in desired light distribution patterns with the use of the single reflection mirror. Further, a strict limitation is imposed on positional relationships between the reflection mirror and the visible LED and between the reflection mirror and the near infrared LED.

SUMMARY OF THE INVENTION

In view of the foregoing, it is an object of the present invention to provide a headlamp which features lower power consumption, a longer service life and a more compact size, and yet is capable of easily projecting visible light and near infrared light in desired light distribution patterns, and to provide a vehicle infrared night vision apparatus employing the headlamp as its light source.

According to the present invention, there is provided a headlamp which includes a wavelength converting member and an excitation light source, wherein the wavelength converting member includes a visible light fluorescent material which is excited by excitation light emitted from the excitation light source to emit visible light, and a near infrared fluorescent material which is excited by the excitation light emitted from the excitation light source to emit near infrared light, and the visible light and the excitation light are mixed together to generate white light, wherein the excitation light source is a semiconductor solid-state element.

The headlamp according to the present invention employs the semiconductor solid-state element as the excitation light source and, therefore, has lower power consumption and a longer service life. Since the wavelength converting member includes both the visible light fluorescent material and the near infrared fluorescent material, the visible light and the near infrared light can be emitted with the use of the single excitation light source. Thus, the headlamp has a compact size.

In addition, the single excitation light source and the wavelength converting member including the visible light fluorescent material and the near infrared fluorescent material makes it possible to project the visible light and the near infrared light from the same light emitting point. Therefore, desired light distribution patterns can be easily provided without complication of the optical system of the headlamp.

DESCRIPTION OF THE PREFERRED EMBODIMENTS

Figure 1:
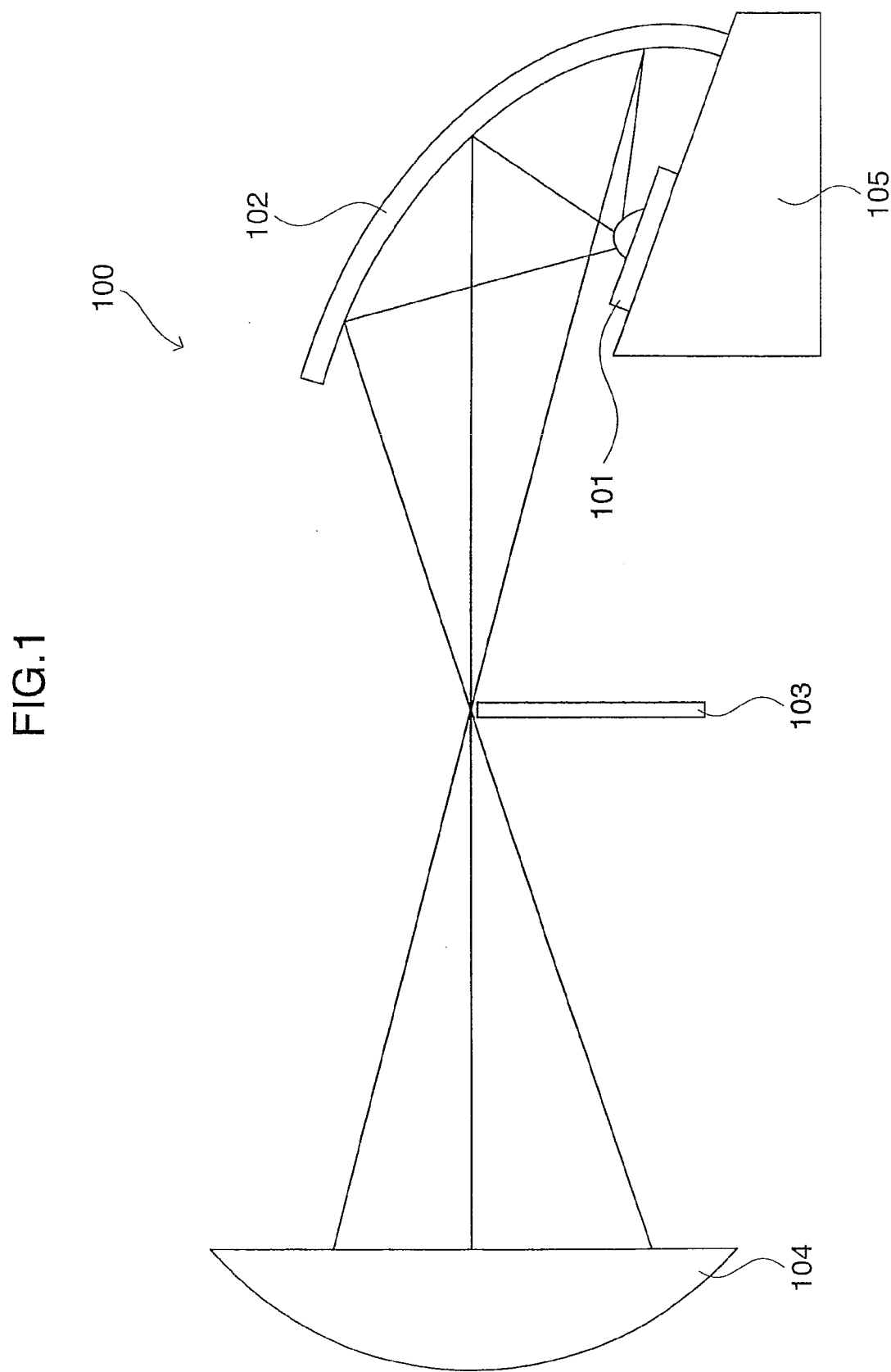
FIG. 1 is a schematic diagram for explaining a headlamp according to Embodiment 1 of the present invention.

An inventive headlamp includes a wavelength converting member and an excitation light source. The wavelength converting member includes a visible light fluorescent material which is excited by excitation light emitted from the excitation light source to emit visible light, and a near infrared fluorescent material which is excited by the excitation light emitted from the excitation light source to emit near infrared light. The visible light and the excitation light are mixed together to generate white light. The excitation light source is a semiconductor solid-state element.

The visible light is light radiation having a wavelength ranging from 380 nm to 780 nm, and the near infrared light is light radiation having a wavelength ranging from 780 nm to 2.5 µm.

In the inventive headlamp, the excitation light source may emit the excitation light in a blue wavelength range, and the visible light fluorescent material may have a light emission peak in a yellow wavelength range.

The blue wavelength range is herein defined as a wavelength range of 430 nm to 480 nm, and the light emitted in the blue wavelength range herein means light radiation having a wavelength falling within the wavelength range of 430 nm to 480 nm.

The yellow wavelength range is herein defined as a wavelength range of 560 nm to 590 nm.

With this arrangement, light to be projected from the headlamp include the white light generated by mixing the excitation light and the visible light emitted from the visible light fluorescent material, and the near infrared light emitted from the near infrared fluorescent material. Therefore, the white light and the near infrared light can be emitted from the single light source (light emitting portion). Thus, the headlamp is capable of projecting the near infrared light while efficiently projecting the white light by employing the excitation light source that emits the light in the blue wavelength range and the fluorescent material having the light emission peak in the yellow wavelength range. Thus, the headlamp has lower power consumption.

In the inventive headlamp, the excitation light source may emit the excitation light in the blue wavelength range, and the visible light fluorescent material may include a first fluorescent material having a light emission peak in a green wavelength range, and a second fluorescent material having a light emission peak in a red wavelength range.

The green wavelength range is herein defined as a wavelength range of 480 nm to 560 nm, and the red wavelength range is herein defined as a wavelength range of 630 nm to 780 nm.

With this arrangement, the headlamp is capable of projecting the near infrared light while projecting the white light by employing the excitation light source that emits the light in the blue wavelength range, the fluorescent material having the light emission peak in the green wavelength range and the fluorescent material having the light emission peak in the red wavelength range in combination. The white light thus projected is excellent in color rendering property. Thus, the headlamp ensures that an object illuminated thereby looks to have a more natural color.

In the inventive headlamp, the excitation light source may emit the excitation light in a blue-violet wavelength range, and the visible light fluorescent material may have a light emission spectrum ranging from a blue wavelength to a red wavelength.

The blue-violet wavelength range is herein defined as a wavelength range of 380 nm to 430 nm.

With this arrangement, the headlamp is capable of projecting the near infrared light while projecting the white light by mixing blue-violet light emitted from the excitation light source and visible light emitted from the visible light fluorescent material as having the light emission spectrum ranging from the blue wavelength to the red wavelength. Thus, the headlamp is very excellent in color rendering property.

The inventive headlamp may further include a light blocking member which defines a light distribution pattern, and the light blocking member preferably partly blocks the visible light and transmits the near infrared light so that the headlamp functions as a vehicle headlamp for projecting a low beam.

The low beam projected from the vehicle headlamp is typically used when there exists an oncoming automobile or an automobile traveling ahead at night. The light distribution pattern defined by the light blocking member of the low beam projection headlamp typically has a light-dark boundary (cut line) such that the road is illuminated with the low beam at a brightness level sufficient for safe driving of a motor vehicle equipped with the headlamp and the low beam is projected neither above the horizon nor toward the opposite lane for prevention of dazzling of a driver of the oncoming automobile.

With this arrangement, the light blocking member, which defines the light distribution pattern of the low beam projection headlamp, partly blocks the visible light. Therefore, the driver of the oncoming automobile is not dazzled. Since the light blocking member transmits the near infrared light, the near infrared light can be projected toward a pedestrian and an obstacle present on the opposite lane. That is, the low beam projection headlamp doubles as an infrared light source for an infrared night vision apparatus and as a basic visible light source for road illumination.

In the inventive headlamp, the excitation light source may be a light emitting diode.

With this arrangement, the light emitting diode employed as the excitation light source has a longer service life and a higher efficiency, thereby reducing the running costs and the power consumption of the headlamp.

In the inventive headlamp, the excitation light source may be a semiconductor laser.

With this arrangement, the semiconductor laser employed as the excitation light source increases the luminance of the headlamp. This makes it possible to reduce the front projection area of an optical system of the headlamp including a reflection mirror and a lens. As a result, the headlamp has a more compact size.

In the inventive headlamp, the near infrared fluorescent material is preferably semiconductor nano-particles.

Particles, such as the semiconductor nano-particles, having particle sizes on the order of nanometers scatter neither the excitation light emitted from the excitation light source nor the light emitted from the visible light fluorescent material and, therefore, do not reduce the white light emission efficiency of the headlamp. Further, the semiconductor nano-particles serving as the fluorescent material have a very high light emission efficiency. Therefore, addition of a small amount of the semiconductor nano-particles ensures highly efficient emission of the near infrared light. This has been first found by the inventors of the present invention. Conventionally, a near infrared fluorescent material capable of efficiently emitting the near infrared light even if being mixed with the visible light fluorescent material is unknown.

This arrangement makes it possible to increase the light emission efficiency and eliminate the scattering by employing the semiconductor nano-particles as the near infrared fluorescent material. Even if the semiconductor nano-particles are mixed with the visible light fluorescent material, the light emission efficiency of the visible light fluorescent material is not reduced. Therefore, the headlamp is capable of efficiently emitting the near infrared light without adversely affecting the visible light emission.

Where the near infrared fluorescent material is the semiconductor nano-particles, the semiconductor nano-particles may comprise InP (indium phosphorus) particles having particle diameters of 5 to 100 nm.

With this arrangement, the InP semiconductor nano-particles having particle diameters not less than 5 nm and not greater than 100 nm efficiently emit the near infrared light, and do not scatter the visible light emitted from the visible light fluorescent material. Therefore, the visible light emission efficiency is not reduced. Thus, the headlamp is capable of efficiently emitting the near infrared light without adversely affecting the visible light emission.

If the particle diameters of the InP semiconductor nano-particles are less than 5 nm, the light emission wavelength is in a visible wavelength range. If the particle diameters of the InP semiconductor nano-particles are greater than 100 nm, the visible light emitted from the visible light fluorescent material is scattered, resulting in lower light emission efficiency.

Where the near infrared fluorescent material is the semiconductor nano-particles, the semiconductor nano-particles may comprise GaAs (gallium arsenic) particles having particle diameters of 10 to 100 nm.

With this arrangement, the GaAs semiconductor nano-particles having particle diameters not less than 10 nm and not greater than 100 nm efficiently emit the near infrared light, and do not scatter the visible light emitted from the visible light fluorescent material. Therefore, the visible light emission efficiency is not reduced. Thus, the headlamp is capable of efficiently emitting the near infrared light without adversely affecting the visible light emission.

If the particle diameters of the GaAs semiconductor nano-particles are less than 10 nm, the light emission wavelength is in the visible wavelength range. If the particle diameters of the GaAs semiconductor nano-particles are greater than 100 nm, the visible light emitted from the visible light fluorescent material is scattered, resulting in lower light emission efficiency.

According to another aspect of the present invention, there is provided a vehicle infrared night vision apparatus which includes the aforementioned inventive headlamp as its light source.

In the inventive vehicle infrared night vision apparatus, the headlamp employed as the light source has lower power consumption, a longer service life and a more compact size as described above, and is capable of easily projecting the visible light and the near infrared light in desired light distribution patters. Therefore, the vehicle infrared night vision apparatus has lower power consumption, a longer service life and a more compact size.

In the inventive vehicle infrared night vision apparatus, the headlamp may be used as a vehicle headlamp for projecting a low beam.

Headlamps and a vehicle infrared night vision apparatus employing the headlamp as its light source according to embodiments of the present invention will hereinafter be described in detail with reference to the drawings.

Embodiment 1

FIG. 1 is a schematic sectional view of a headlamp according to Embodiment 1. In FIG. 1, the headlamp 100 includes a light emitting portion 101, a reflection mirror 102 having a rotational ellipsoidal surface, a light blocking plate 103, and a projection lens 104. The light emitting portion 101 includes a wavelength converting member including a visible light fluorescent material and a near infrared fluorescent material, and an excitation light source of a semiconductor solid-state element. The light blocking plate 103 transmits near infrared light, and partly blocks visible light to define a cut line for a low beam. The light emitting portion 101 and the reflection mirror 102 are fixed to a unitary support member 105.

Figure 2:
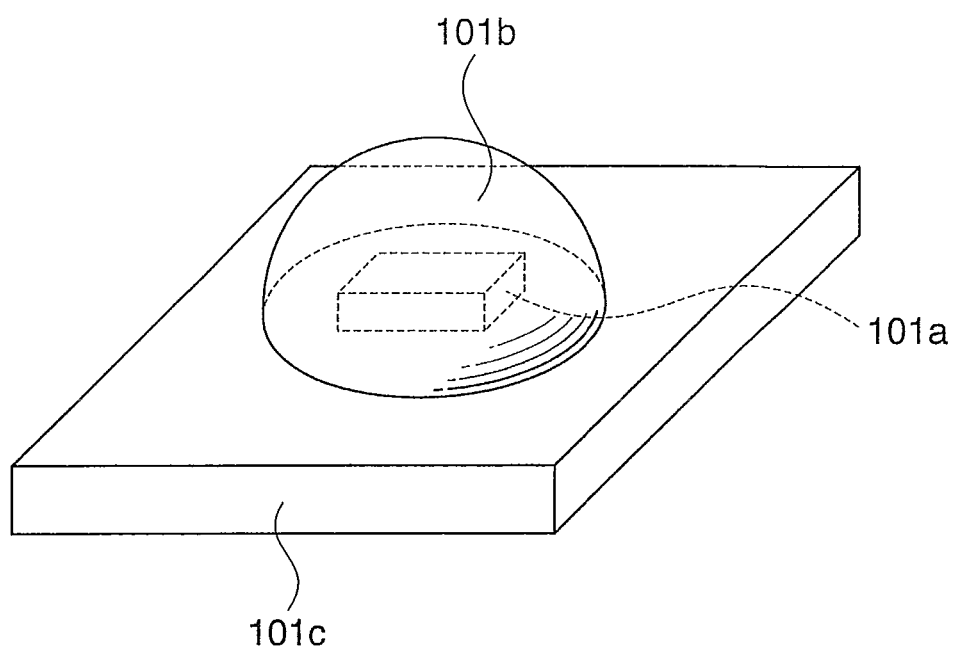
FIG. 2 is a perspective diagram for explaining a light emitting portion of the headlamp according to Embodiment 1 of the present invention.

As shown in FIG. 2, the light emitting portion 101 includes an excitation light source 101a, a wavelength converting member 101b, and a ceramic package 101c on which the wavelength converting member 101b is fixed. The excitation light source 101a is a GaN light emitting diode chip (semiconductor solid-state element) which emits light at a wavelength of 450 nm. The wavelength converting member 101b is composed of a material prepared by dispersing and mixing a yellow fluorescent material (a visible light fluorescent material $(Sr,Ba)_2SiO_4:Eu^{2+}$ available from Toyoda Gosei Co., Ltd.) which absorbs light at a wavelength of 450 nm and emits light at a wavelength of 565 nm and an InP nano-particle fluorescent material (a near infrared fluorescent material having a particle diameter of 10 nm) in a rubber-type silicone resin (KER-2500 available from Shin-Etsu Chemical Ltd.). The package 101c has an improved heat dissipating property for dissipating heat from the light emitting diode chip 101a The light emitting portion 101 emits white light generated by mixing yellow light emitted at a wavelength of 565 nm from the visible light fluorescent material and blue light emitted at a wavelength of 450 nm from the light emitting diode chip by applying a voltage to the light emitting diode chip for energization, and emits near infrared light generated at a wavelength of about 900 nm from the nano-particle fluorescent material. That is, the wavelength converting member 101b includes the visible light fluorescent material and the near infrared fluorescent material. The wavelengths of light to be emitted from the light emitting portion 101 include the wavelength of the light emitted from the excitation light source 101a, the wavelength of the light emitted from the visible light fluorescent material and the wavelength of the light emitted from the near infrared fluorescent material.

According to JIS D5500 (automotive lamps), the color of light of an automotive headlamp is specified to be pale yellow (light yellow) or white (and is specified to be white for an automobile produced on and after Jan. 1, 2006). Particularly, the chromaticity of the white color should be $0.500 \geq x \geq 0.310$, $y \leq 0.150 + 0.640x$, $y \geq 0.050 + 0.750x$ and $0.440 \geq y \geq 0.382$ (wherein x and y are chromaticity coordinates in JIS Z8701).

In Embodiment 1, the white light is provided by balancing the blue light and the yellow light within the aforementioned chromaticity range.

Figure 3:
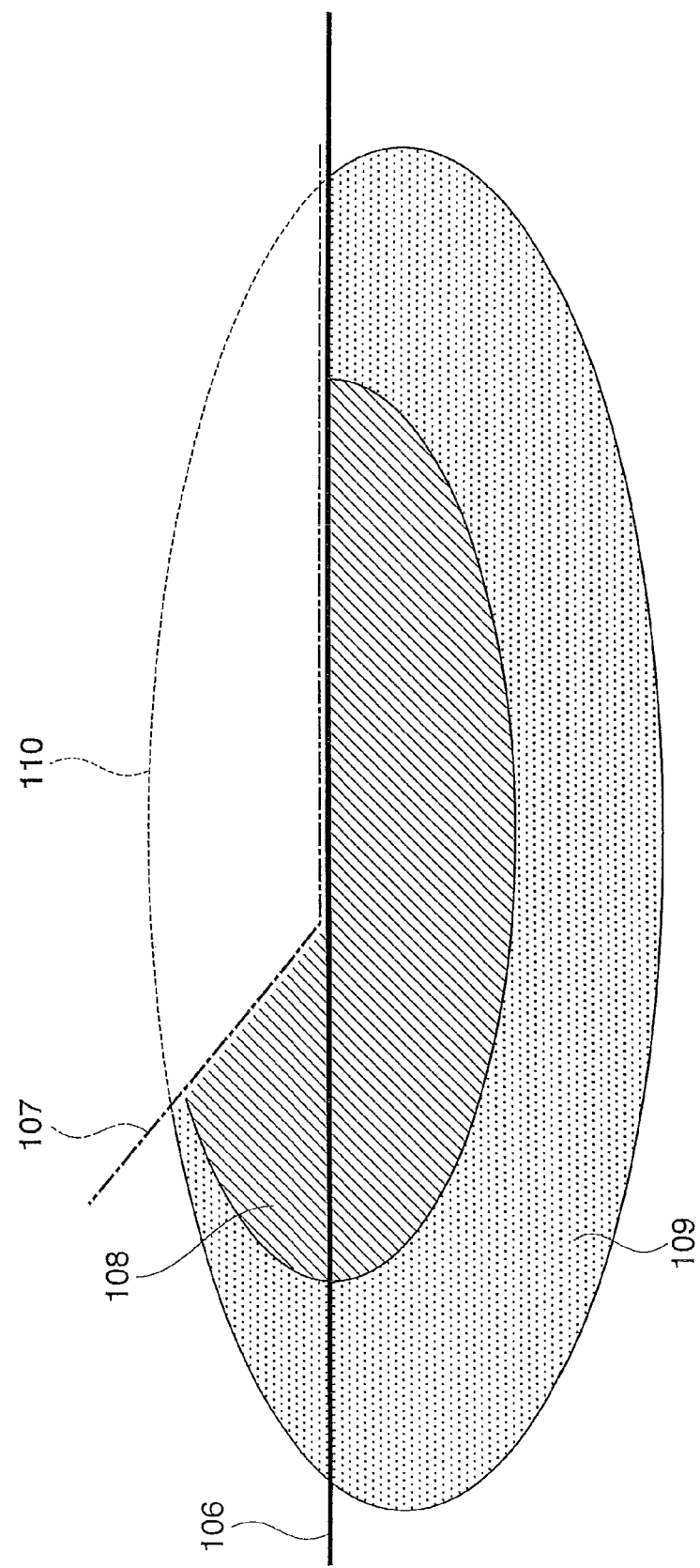
FIG. 3 is a schematic diagram for explaining a visible light distribution pattern and a near infrared light distribution pattern of the headlamp according to Embodiment 1 of the present invention.

FIG. 3 is a schematic diagram for explaining light distribution patterns of the low beam headlamp described in Embodiment 1. In FIG. 3, a transverse line 106 indicates a horizontal line. A dash-dotted line 107 indicates a cut line for the low beam. Visible light projected above the dash-dotted line 107 is blocked by the light blocking plate 103. A hatched portion 108 and a shaded portion 109 indicate regions on which both the white light (visible light) and the near infrared light are projected, and the light intensity is higher in the hatched portion 108. A portion surrounded by a broken line 110 above the cut line indicates a region on which only the near infrared light is projected.

With this arrangement, the visible light is reliably blocked for prevention of the dazzling of a driver of an oncoming automobile, a pedestrian and the like. Further, the near infrared light is projected to a region including an opposite lane in which the visible light is cut by the low beam cut line. Therefore, a vehicle infrared night vision apparatus utilizing the near infrared light can be actuated simply by turning on the low beam projection headlamp.

Thus, the headlamp of this embodiment makes it possible to project the visible light in a desired distribution pattern for the low beam while projecting the near infrared light to a desired wide region including the opposite lane beyond the visible light distribution pattern. Therefore, the size and the power consumption of the apparatus can be reduced without the need for providing an additional infrared projector. Further, production costs for production of the apparatus and operational costs for repair and maintenance of the apparatus can be reduced without the need for alignment of the optical axis of a light source of the infrared projector.

In Embodiment 1, the light emitting diode having a light emission peak at 450 nm is used as the excitation light source, but not limitative. Any other semiconductor solid-state element capable of emitting light in a blue wavelength range (from 430 nm to 480 nm) may be employed as the excitation light source in the embodiment of the present invention.

In Embodiment 1, the fluorescent material $(Sr,Ba)_2SiO_4$:$Eu^{2+}$ which emits light at 565 nm is employed as the visible light fluorescent material by way of example, but not limitative. Any other yellow fluorescent material having a light emission peak in a wavelength range of about 560 to about 590 nm may be employed in combination with the semiconductor solid-state element capable of emitting light in the blue wavelength range. Thus, the headlamp can project the white light. Even in this case, the chromaticity of the white light can be controlled within the chromaticity range specified by JIS D5500 by properly balancing the density of the yellow fluorescent material and the intensity of the excitation light.

A green fluorescent material serving as a first fluorescent material having a light emission peak in a green wavelength range and a red fluorescent material serving as a second fluorescent material having a light emission peak in a red wavelength range are mixed in proper amounts with each other, and the resulting mixture is used as the visible light fluorescent material instead of the aforementioned yellow fluorescent material. The blue excitation light source is employed in combination with the green fluorescent material and the red fluorescent material, whereby the headlamp can project white light having an excellent color rendering property.

Particularly, the headlamp excellent in color rendering property effectively improves the visibility of a red road sign, and facilitates the detection of a pedestrian and an obstacle on a road. Here, green light is defined as light having a wavelength of 480 nm to 560 nm, and red light is defined as light having a wavelength of 630 nm to 780 nm. By employing the blue excitation light source in combination with the fluorescent material which emits light in the green wavelength range and the fluorescent material which emits light in the red wavelength range, the white light to be emitted by the headlamp contains greater amounts of a green wavelength component and a red wavelength component which are likely to be insufficient when the blue excitation light source is employed in combination with the yellow fluorescent material, and is excellent in color rendering property.

Examples of the green fluorescent material and the red fluorescent material to be properly used in this embodiment are β-SiAlON:$Eu^{2+}$ and CaSiAlON:$Eu^{2+}$, respectively.

Even in this case, the chromaticity of the white light can be controlled within the chromaticity range specified by the JIS D5500 by properly balancing the amounts of the green fluorescent material and the red fluorescent material and the power of the blue excitation light source.

In Embodiment 1, InP nano-particles having a particle diameter of 10 nm are used as the near infrared fluorescent material. In this case, the wavelength of the near infrared light is about 900 nm. InP nano-particles having particle diameters not less than 5 nm and not greater than 50 nm can emit near infrared light at a wavelength of about 850 nm to about 950 nm. Further, InP nano-particles having particle diameters not less than 5 nm and not greater than 100 nm can emit near infrared light at a wavelength of about 850 nm to about 1 μm. Therefore, the particle diameters of the InP nano-particles are not necessarily required to be exactly 10 nm, but may mostly fall within the aforementioned particle diameter range. Nevertheless, an average of the particle diameter of the InP nano-particles is preferably 10 nm.

The InP nano-particles are prepared through a so-called reflux method by mixing an In precursor ($InCl_3$ or $In(CH_3COO)_3$ and a P precursor ($P[Si(CH_3)_3]_3$) in a solvent and thermally decomposing the resulting mixture.

The particles having sizes on the order of nanometers scatter neither the excitation light emitted from the excitation light source nor the visible light emitted from the visible light fluorescent material and, therefore, do not reduce the white light emission efficiency of the headlamp. Further, the nano-particles serving as the fluorescent material have a very high light emission efficiency, so that addition of a small amount of the nano-particles ensures highly efficient emission of the near infrared light.

The wavelength of the near infrared light to be emitted is preferably about 900 nm as in this embodiment. The near infrared light having a wavelength of about 900 nm is compatible with the sensible peak wavelength of a silicon PIN photodiode which is a detector available at a lower cost. This reduces the overall costs of the vehicle infrared night vision apparatus. Further, the amount of the near infrared fluorescent material to be contained in the wavelength converting member can be reduced.

The near infrared fluorescent material of the InP nano-particles is transparent. This is advantageous in that the aestheticity of the optical system of the headlamp is not deteriorated.

Another example of the semiconductor nano-particles for the near infrared fluorescent material is GaAs. GaAs nano-particles having particle diameters not less than 10 nm and not greater than 100 nm emit the near infrared light at a wavelength of about 850 nm to about 950 nm. The GaAs nano-particles can also be prepared through the reflux method.

Naturally, the near infrared fluorescent material to be employed in the present invention is not limited to the semiconductor nano-particle fluorescent materials described above. Where a near infrared fluorescent material capable of emitting the near infrared light at about 900 nm is selected, the less expensive silicon PIN photodiode described above can be used.

In Embodiment 1, the rubber-type silicone resin is used as a filler for the fluorescent materials, but a resin-type silicone resin or an inorganic glass material may be used.

The headlamp 100 of Embodiment 1 may be used, for example, as a vehicle headlamp for projection of a high beam. In this case, there is no need to provide the light blocking plate defining the cut line, so that the visible light and the near infrared light are projected in the same light distribution pattern.

The headlamp 100 of Embodiment 1 employs the GaN light emitting diode (semiconductor solid-state element) as the excitation light source, and employs the fluorescent materials for the emission of the white light and the near infrared light. Therefore, the service life of the headlamp 100 is much longer than that of a halogen lamp, and is comparable to that of an automobile itself. One of important points for safe driving of the automobile at night is to prevent sudden breakdown of the headlamp. The headlamp of Embodiment 1 is substantially free from the sudden breakdown during the driving. The headlamp 100 of Embodiment 1 is highly effective for the safe driving of the automobile at night.

Further, the headlamp 100 of Embodiment 1 is configured such that the emission of the near infrared light is also achieved by employing the semiconductor solid-state element as the excitation light source in combination with the near infrared fluorescent material. As a result, the infrared night vision apparatus also has a longer service life, and is effective for improvement of safety in driving at night. As compared with the arrangement in which the conventional high beam halogen lamp is used as the near infrared light source for the infrared night vision apparatus, the power consumption can be drastically reduced because there is no need to constantly turn on the high beam halogen lamp. Further, the light sources for the low beam projection headlamp and the high beam projection headlamp can be each replaced with a semiconductor solid-state element which has a longer service life. As a result, the headlamp ensures safer night driving of the automobile for a longer period of time.

HID (high injection discharge) lamps which are now popular for luxury automobiles generally have a higher color temperature and hence a lower brightness for a while immediately after start-up thereof. Therefore, several seconds to several tens of seconds are required for stabilizing the light color and the luminous flux. On the contrary, the headlamp 100 of Embodiment 1 of the present invention, which employs the semiconductor solid-state element as the excitation light source, is advantageous in that the time required for the luminous flux to reach the maximum level from the start-up thereof can be minimized. This significantly facilitates the visual detection immediately after the automobile travels into a tunnel or starts traveling at night.

Since the near infrared light source and the white light source are unified with each other, the headlamp advantageously has a more compact size. This increases the design flexibility for the automobile body.

Embodiment 2

The construction of a headlamp according to Embodiment 2 of the present invention will hereinafter be described. The headlamp of Embodiment 2 has substantially the same construction as the headlamp of Embodiment 1 described above, except that the excitation light source of the light emitting portion is a semiconductor laser element. More specifically, the light emitting portion is configured such that the wavelength converting member containing the visible light fluorescent material and the near infrared fluorescent material is disposed on a light emitting side of the semiconductor laser element from which the excitation light (laser beam) is emitted.

In Embodiment 2, the semiconductor laser element serving as the light source oscillates at a wavelength of 405 nm. The visible light fluorescent material includes two types of fluorescent materials which absorb light at a wavelength of 405 nm and respectively emit cyan light and red light (Ca-α-SiAlON:$Ce^{3+}$ capable of emitting cyan light and CaAlSiN$_3$:$Eu^{2+}$ capable of emitting red light). The visible light fluorescent material of Embodiment 2 which includes these fluorescent materials in combination has a light emission spectrum ranging from the blue wavelength to the red wavelength. The visible light fluorescent material is excited by the semiconductor laser element oscillated at a wavelength of 405 nm to provide the white light. A GaAs nano-particle semiconductor having a particle diameter of 50 nm is used as the near infrared fluorescent material. The visible light fluorescent material and the near infrared fluorescent material are dispersed and sealed in a resin type silicone resin (X-32-2480-4 available from Shin-Etsu Chemical Co., Ltd.)

By using the semiconductor laser element as the light source, the density of light energy to be emitted toward the wavelength converting member is increased. As a result, the light emitting portion including the semiconductor laser element and the wavelength converting member in combination has a higher luminance. The vehicle headlamp is required to have a luminous intensity of 20,000 candela for projecting the low beam forward, and a luminous intensity of 50,000 to 100,000 candela for projecting the high beam forward. According to JIS D5500, a four-lamp low beam system is required to have a maximum luminous intensity of not higher than 20,000 candela, and two-lamp and single-lamp low beam systems are each required to have a maximum luminous intensity of not higher than 15,000 candela. Further, a high beam system is required to have a maximum luminous intensity of not greater than 112,500 candela. If the luminance is higher, the front projection area of the light source system (as seen from the front side of the light source system) required for providing the same luminous intensity can be reduced. Therefore, the sizes of the reflection mirror and the projection lens of the headlamp required for providing the same brightness can be reduced by employing the light emitting portion including the high luminance semiconductor laser element as the excitation light source. To increase the luminance, the size of the wavelength converting member of the light emitting portion is reduced as much as possible.

With this arrangement, the headlamp can have a more compact size. The effect provided by employing the semiconductor laser as the excitation light source of the light emitting portion is more advantageous for the high beam headlamp which is required to have a higher luminous intensity. Where the headlamp of this embodiment is used as a high beam projection headlamp, the light blocking plate defining the cut line may be obviated.

Of course, the headlamp of this embodiment may be used as a low beam projection headlamp. In this case, the luminous intensity may be about one-third that of the high beam projection headlamp, so that the sizes of the reflection mirror and the projection lens can be correspondingly reduced. Therefore, the headlamp has a very compact size.

In Embodiment 2, the excitation light source capable of emitting light at 405 nm and the visible light fluorescent material including the two types of fluorescent materials (i.e., the cyan fluorescent material and the red fluorescent material) are employed in combination by way of example, but this arrangement is not limitative. The excitation light source may emit the excitation light in the blue-violet wavelength range, and the visible light fluorescent material may have a light emission spectrum ranging from the blue wavelength to the red wavelength.

Embodiment 3

Figure 4:
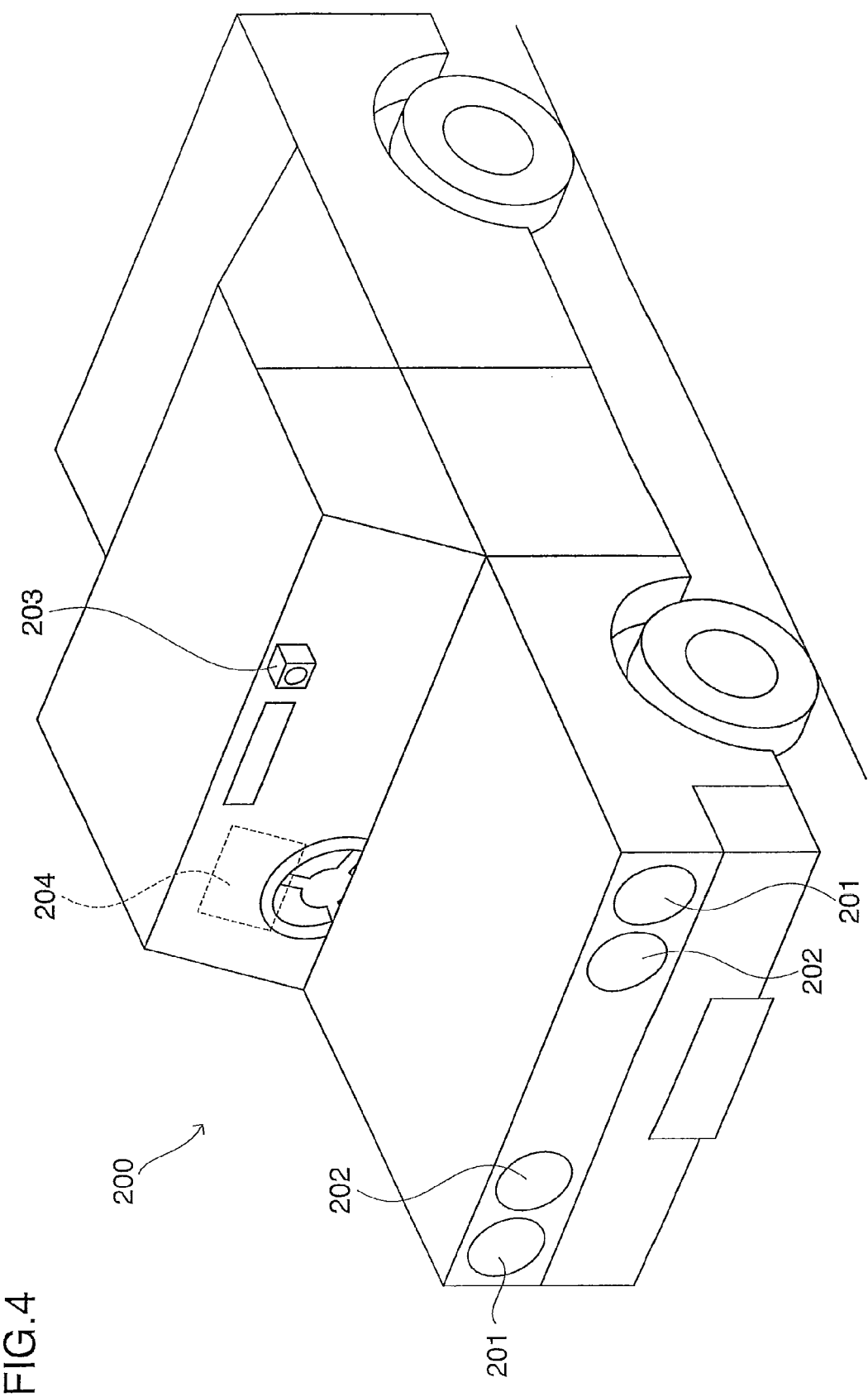
FIG. 4 is a schematic diagram for explaining a vehicle infrared night vision apparatus according to Embodiment 3 of the present invention.

FIG. 4 is a schematic diagram illustrating a vehicle infrared night vision apparatus 200 according to Embodiment 3. Two low beam projection headlamps 201 each having the same construction as the headlamp 100 of Embodiment 1 are disposed on right and left portions of the front face (front portion) of an automobile. High beam projection headlamps 202 each having substantially the same construction as the headlamp of Embodiment 2 except that the light blocking plate is removed are disposed laterally inward of the low beam projection headlamps 201. Further, a near infrared camera 203 is disposed on a lateral side of a rear-view mirror provided inward of a front glass. An obstacle, a pedestrian and the like detected by the near infrared camera 203 are displayed on a front glass portion 204 by a so-called head-up display method. The aforementioned silicon PIN photodiode is used as a light receiving element of the near infrared camera.

In Embodiment 3, semiconductor solid-state elements are employed as the light emitting portions for the low beam projection headlamps and the high beam projection headlamps, so that the vehicle infrared night vision apparatus has lower power consumption and a longer service life. Further, the vehicle infrared night vision apparatus is provided by employing the near infrared camera in combination with the low beam projection headlamps which each have a compact size and yet are each capable of projecting the visible light and the near infrared light in desired light distribution patterns.

Therefore, there is no need to use the conventional high beam halogen lamps each having higher power consumption and a shorter service life as the near infrared light sources and to constantly turn on the high beam lamps during the projection of the low beams.

In Embodiment 3, the vehicle infrared night vision apparatus can be actuated during the projection of the high beams simply by turning on the high beam projection headlamps, because the high beam projection headlamps also each include the near infrared fluorescent material.

In Embodiment 3, as described above, the semiconductor solid-state elements each having a longer service life can be employed as the light sources of the low beam projection headlamps and the high beam projection headlamps which are very important for safe driving at night. Further, the high beam headlamps are used only when the high beams are required. Therefore, the headlamps each have a further longer service life.

While Embodiments 1 to 3 of the present invention have thus been described, the arrangements of Embodiments 1 to 3 may be employed in combination as desired. It should be understood that all the disclosed embodiments are merely illustrative and not restrictive. The scope of the invention is defined by the purview of the appended claims but not by the above description, and is intended to embrace the purview of the claims and their equivalents, and all alterations made within the scope of the invention.

Although the vehicle headlamps have been described by way of examples, the present invention is generally applicable to projectors which are desired to project both the visible light and the near infrared light.

What is claimed is:

1. A headlamp comprising:
a wavelength converting member; and
a single excitation light source emitting excitation light in a blue wavelength range or a blue-violet wavelength range;
wherein the wavelength converting member includes a visible light fluorescent material which is excited by the excitation light emitted from the single excitation light source to emit visible light, and, in addition to the visible light fluorescent material, a near infrared fluorescent material which is excited by the excitation light emitted from the single excitation light source to emit invisible near infrared light having a peak wavelength falling substantially within a range of 850 nm to 1000 nm;
the visible light and the excitation light emitted from the single excitation light source are mixed together to generate white light; and
the excitation light source is a semiconductor solid-state element.

2. The headlamp according to claim 1, wherein
the visible light fluorescent material has a light emission peak in a yellow wavelength range.

3. The headlamp according to claim 1, wherein
the visible light fluorescent material includes a first fluorescent material having a light emission peak in a green wavelength range and a second fluorescent material having a light emission peak in a red wavelength range.

4. The headlamp according to claim 1, wherein
the visible light fluorescent material has a light emission spectrum including a from a blue wavelength to a red wavelength.

5. The headlamp according to claim 1, further comprising a light blocking member which defines a light distribution pattern,
wherein the light blocking member partly blocks the visible light and transmits the invisible near infrared light so that the headlamp functions as a vehicle headlamp for projecting a low beam.

6. The headlamp according to claim 1,
wherein the excitation light source is a light emitting diode.

7. The headlamp according to claim 1,
wherein the excitation light source is a semiconductor laser.

8. The headlamp according to claim 1,
wherein the semiconductor nano-particles comprise InP particles having a particle diameter of 5 to 100 nm.

9. The headlamp according to claim 1,
wherein the semiconductor nano-particles comprise GaAs particles having a particle diameter of 10 to 100 nm.

10. The headlamp according to claim 1, wherein
the peak wavelength of the emitted invisible near infrared light falls substantially within a range of 850 nm to 950 nm.

11. The headlamp according to claim 10, wherein
the peak wavelength of the emitted invisible near infrared light is about 900 nm.

12. The headlamp according to claim 1, wherein
the near infrared fluorescent material is semiconductor nano-particles.

13. A vehicle infrared night vision apparatus comprising:
a headlamp; and
a near infrared camera;
wherein the headlamp includes:
a wavelength converting member; and
a single excitation light source emitting excitation light in a blue wavelength range or a blue-violet wavelength range;
wherein the wavelength converting member includes a visible light fluorescent material which is excited by the excitation light emitted from the single excitation light source to emit visible light, and, in addition to the visible light fluorescent material, a near infrared fluorescent material which is excited by the excitation light emitted from the single excitation light source to emit invisible near infrared light having a peak wavelength falling substantially within a range of 850 nm to 1000 nm;

the visible light and the excitation light emitted from the single excitation light source are mixed together to generate white light;

the excitation light source is a semiconductor solid-state element; and wherein the near infrared camera includes:
  a light receiving element having a silicon PIN diode and receiving the invisible near infrared light emitted from the near infrared fluorescent material.

14. The vehicle infrared night vision apparatus according to claim 13, wherein
  the headlamp is used as a vehicle headlamp for projecting a low beam.

15. The vehicle infrared night vision apparatus according to claim 13, wherein
  the peak wavelength of the emitted invisible infrared light falls substantially within a range of 850 nm to 950 nm.

16. The vehicle infrared night vision apparatus according to claim 15, wherein
  the peak wavelength of the emitted invisible infrared light is about 900 nm.

17. The vehicle infrared night vision apparatus according to claim 13, wherein
  the near infrared fluorescent material is semiconductor nano-particles.

* * * * *